US008485675B2

(12) United States Patent
Allen et al.

(10) Patent No.: US 8,485,675 B2

(45) Date of Patent: Jul. 16, 2013

(54) ILLUMINATION ASSEMBLY FOR A SCANNER

(75) Inventors: Eugene David Allen, Richmond, KY (US); Chengwu Cui, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 281 days.

(21) Appl. No.: 12/979,882

(22) Filed: Dec. 28, 2010

(65) Prior Publication Data

US 2012/0162738 A1 Jun. 28, 2012

(51) Int. Cl.
*G02B 5/08* (2006.01)

(52) U.S. Cl.
USPC .......................................................... 359/850

(58) Field of Classification Search
USPC ........................... 359/850, 857, 861; 385/119
See application file for complete search history.

(56) References Cited

U.S. PATENT DOCUMENTS

2009/0003784 A1 * 1/2009 Kabuki et al. ................. 385/119

* cited by examiner

*Primary Examiner* — Euncha Cherry

(74) *Attorney, Agent, or Firm* — Justin M Tromp

(57) ABSTRACT

An illumination assembly for a scanner according to one example embodiment includes a light source, a first reflector and a second reflector. The first reflector has a curved structure and is positioned directly in the optical path of the light source. The first reflector has a first portion and a second portion. The first portion of the first reflector is positioned to reflect light received from the light source toward a target area to be scanned. The second portion of the first reflector is positioned to reflect light received from the light source toward the second reflector. The second reflector is positioned to reflect light received from the first reflector toward the target area.

18 Claims, 3 Drawing Sheets

ILLUMINATION ASSEMBLY FOR A SCANNER

CROSS REFERENCES TO RELATED APPLICATIONS

This application is related to U.S. patent application Ser. No. 12/979,797, which is incorporated herein by reference, entitled "Illumination Assembly for a Scanner" filed on even date herewith and assigned to the same assignee as the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners, and more specifically, to an illumination assembly for a scanner.

2. Description of the Related Art

High speed scanners typically require high intensity illumination. One example of a light source that provides the required illumination is an external electrode xenon fluorescent lamp. However, various problems are associated with the use of a xenon fluorescent lamp as a light source. For example, a high power xenon fluorescent lamp must be used to generate the required illumination. Such high power lamps may generate excessive heat. To address this issue, a cooling fan and a vent may be positioned on the scanner; however, this adds cost and acoustic noise and, in some cases, may result in potential contamination through the vent. Further, the high power xenon fluorescent lamp needs a high frequency and high voltage inverter, which further adversely impacts the scanner both in terms of safety and signal quality.

Recent technological developments in the field of scanners have provided another light source, white LEDs (light emitting diodes). In many cases, one high power LED may be used in conjunction with a light guide to generate the required illumination. Alternatively, an array of medium power LEDs may be used. The array of medium power LEDs generates more light and is desired for high speed scanners. However, it is desired to use as few LEDs as possible to reduce the cost of the device. The white LEDs may be generally blue LEDs that use a blue LED die with yellow phosphor to form white light. Light produced by such LEDs may not be sufficiently mixed and direct incidences of such light at a target area, such as a sheet to be scanned, is not desired. Accordingly, it will be appreciated that an illumination assembly for a scanner that provides high intensity illumination in an efficient manner is desired.

SUMMARY OF THE DISCLOSURE

An illumination assembly for a scanner according to one example embodiment includes a light source, a first reflector and a second reflector. The first reflector has a curved structure and is positioned directly in the optical path of the light source. The first reflector has a first portion and a second portion. The first portion of the first reflector is positioned to reflect light received from the light source toward a target area to be scanned. The second portion of the first reflector is positioned to reflect light received from the light source toward the second reflector. The second reflector is positioned to reflect light received from the first reflector toward the target area.

Embodiments include those wherein the first reflector has a generally C-shaped structure that substantially encloses the light source to prevent direct illumination of the target area by the light source. In some embodiments, a reflecting surface of the first reflector is a substantially single-faceted, curved surface. Alternatives include those wherein the reflecting surface of the first reflector is a multi-faceted surface. In such alternatives, the first portion and the second portion of the first reflector may each include a plurality of angularly oriented substantially straight sections. Embodiments include those wherein the second reflector is positioned on an opposite side of the target area from the first reflector. A reflecting surface of the second reflector may be curved or substantially planar.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item. Furthermore, the terms "first," "second," and the like, herein do not denote any order, quantity, or importance, but rather are used to distinguish one element from another. Unless limited otherwise, the terms "coupled," and variations thereof herein are used broadly and encompass direct and indirect couplings. Moreover, the use of "coupled" and variations thereof herein does not denote a limitation to the arrangement of two components.

The present disclosure provides an illumination assembly for a scanner. The illumination assembly provides high intensity illumination to be focused on a target area, such as a media sheet, to be scanned.

Figure 1:
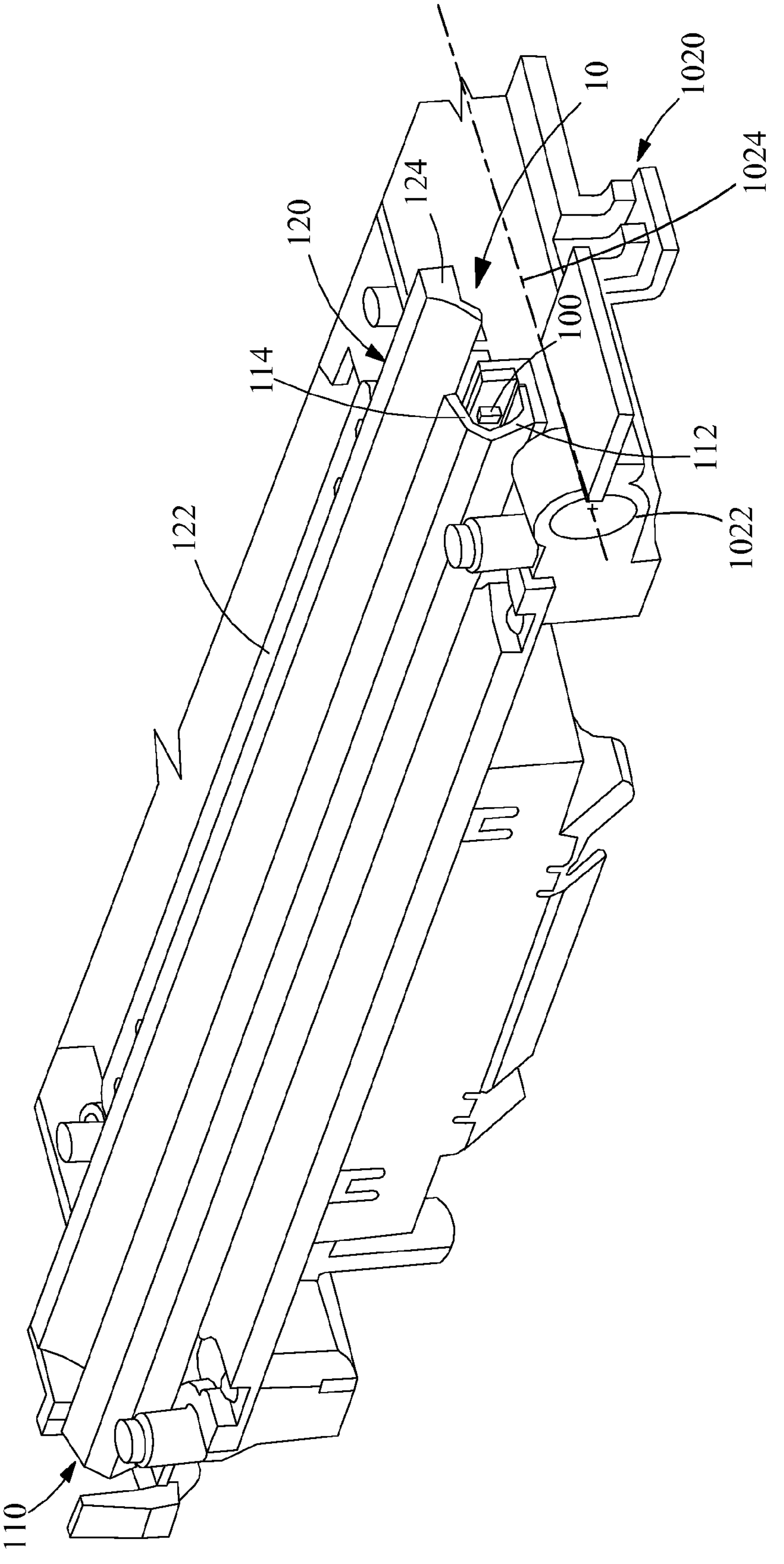
FIG. 1 is a perspective view depicting an illumination assembly positioned on a scan head frame of a scanner, according to one example embodiment.
Figure 2:
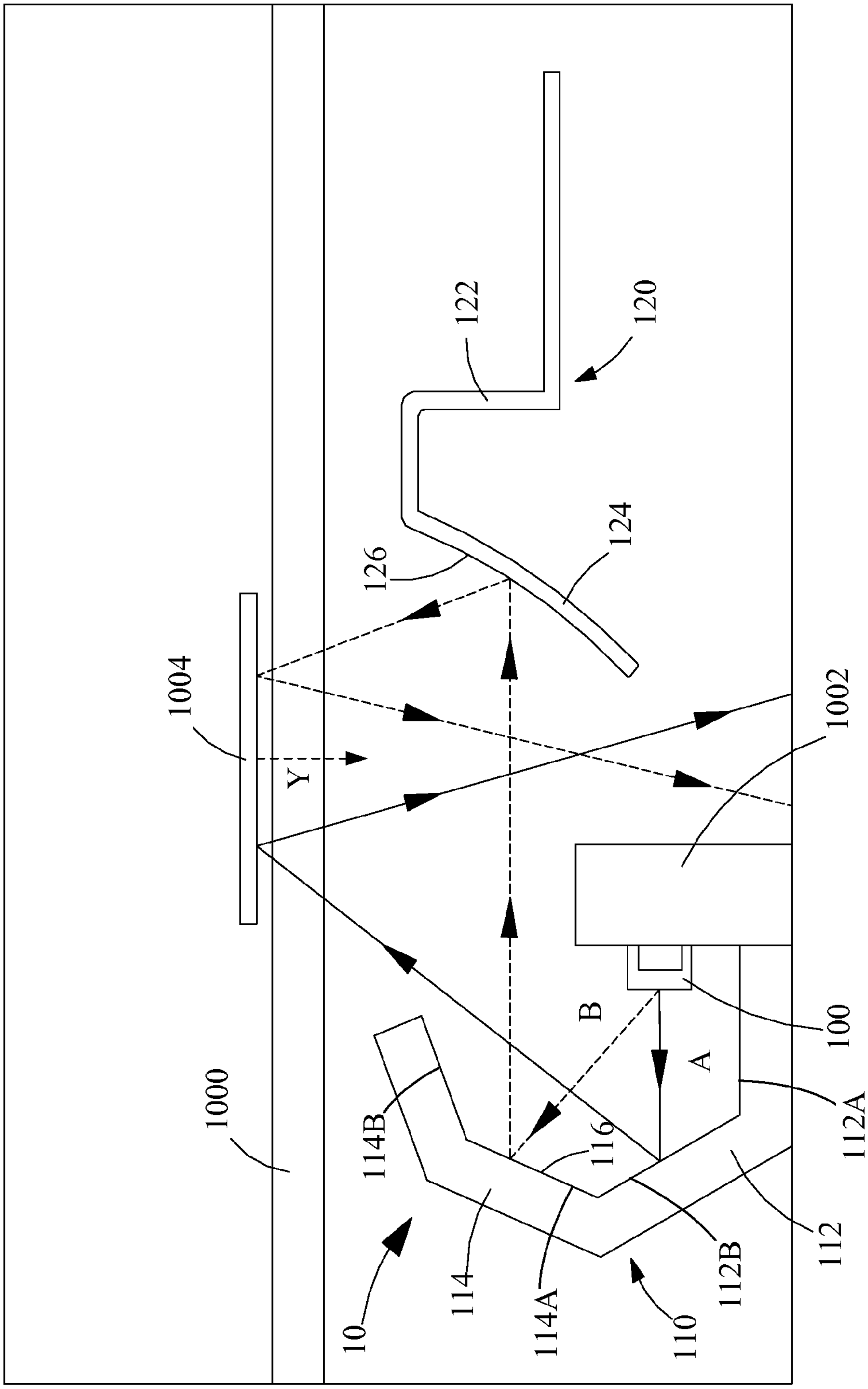
FIG. 2 is a side view depicting an illumination assembly for a scanner, according to one example embodiment.

Referring now to FIG. 1, an illumination assembly 10 is carried by a scan head frame 1020 of a scanner. In the example embodiment shown, scan head frame 1020 is positioned under a platen glass 1000 of a scanner (FIG. 2). In this embodiment, illumination assembly 10 reciprocates back and forth under platen glass 1000 along with scan head frame 1020 which is driven by a driving mechanism (not shown) of the scanner. Embodiments include those wherein scan head frame 1020 includes at least one pair of bushings 1022 aligned along bushing axis 1024 at a distal end of scan head frame 1020. Bushings 1022 receive a guide rod (not shown) to facilitate reciprocating back-and-forth movement of the scanner along the guide rod to permit the scanner to scan the entirety of an adjacent document. Alternatives include those wherein scan head frame 1020 is mounted in a stationary manner such as along a media path of an automatic document feeder as is known in the art.

Referring to FIG. 2, illumination assembly 10 includes a light source 100. Light source 100 is positioned on a body portion 1002 of scan head frame 1020 in a manner such that light source 100 receives electrical power from a power source (not shown). Body portion 1002 may be integral with scan head frame 1020 or it may be a separate component mounted thereon. In one embodiment, light source 100 includes at least one white light emitting diode (LED). Specifically, light source 100 may be an array of white LEDs. For example, light source 100 may be blue LEDs coated with yellow phosphor to form white light. However, it will be appreciated by those skilled in the art that instead of utilizing an array of LEDs, a single high power white LED may be utilized as a light source. Moreover, instead of blue LEDs coated with yellow phosphor, an array of red, green and blue LEDs may be utilized as white LEDs.

Illumination assembly 10 further includes a primary reflector 110. Primary reflector 110 is carried by body portion 1002 of scan head frame 1020 and positioned directly in the optical path of light source 100, as shown in FIG. 2. In the example embodiment illustrated, primary reflector 110 includes a first portion 112 and a second portion 114 integral with first portion 112. First portion 112 is coupled with body portion 1002 using suitable attachment means, such as adhesive or screws. Alternatives include those wherein first portion 112 and second portion 114 are two separate portions coupled to each other to form primary reflector 110.

In the example embodiment illustrated, primary reflector 110 includes a generally curved structure that substantially encloses light source 100. For example, as shown in FIG. 2, primary reflector 110 has a generally C-shaped structure that substantially encloses light source 100 and thereby defines a light path. The light path may be defined as a path followed by light beams to reach a target area 1004 when light source 100 emits light, which will be explained herein further in greater detail. Further, target area 1004 may be considered as an object, such as a media sheet, disposed on platen glass 1000 to be scanned.

In the example embodiment illustrated, primary reflector 110 has a multi-faceted reflecting surface 116 positioned directly in the optical path of light source 100. In some embodiments, reflecting surface 116 is composed substantially of plastic or glass. Each of first portion 112 and second portion 114 of primary reflector 110 includes angularly oriented sections that form multi-faceted reflecting surface 116 of primary reflector 110. For example, as shown in FIG. 2, each of first portion 112 and second portion 114 has two angularly oriented substantially straight sections 112A, 112B and 114A, 114B, respectively, forming multi-faceted reflecting surface 116. Alternatively, first portion 112 and second portion 114 may have more or fewer than two angularly oriented substantially straight sections forming a multi-faceted reflecting surface of primary reflector 110. In the example embodiment illustrated, each of angularly oriented substantially straight sections 112A, 112B of first portion 112 forms an angle between 90° and 180° relative to target area 1004 such that the light received by first portion 112 from light source 100 is generally reflected in the direction of target area 1004. Further, each of angularly oriented substantially straight sections 114A, 114B of second portion 114 forms an angle between 0° and 90° relative to target area 1004 such that the light received by second portion 114 from light source 100 is generally reflected in the direction of an auxiliary reflector 120, which will be explained herein further in greater detail. Light source 100 and primary reflector 110 are spaced vertically away from target area 1004 as indicated by arrow 'Y.' As used herein, vertical direction Y is orthogonal to target area 1004 and therefore the term vertical is relative to the orientation of target area 1004. For example, target area 1004 may be disposed on a substantially horizontal flatbed portion of a conventional scanner such that vertical direction 'Y' is substantially vertical with respect to the ground. However, alternatives include those wherein target area 1004 is disposed in an orientation other than horizontal such that vertical direction 'Y' is not vertical with respect to the ground. For example, target area 1004 may be positioned in an orientation other than horizontal in the body of an automatic document feeder as is known in the art.

Primary reflector 110 may be a diffuse reflector that is composed of a material, such as polycrystalline material, which exhibits diffuse reflection. Alternatively, primary reflector 110 may be a specular reflector that is composed of a material that exhibits specular reflection. Moreover, primary reflector 110 may be a partial diffuse reflector or a partial specular reflector. Specifically, one of first portion 112 and second portion 114 may be a diffuse reflector and the other portion (remaining of first portion 112 and second portion 114) may be a specular reflector or vice-versa. Therefore, first portion 112 and second portion 114 of primary reflector 110 may be adjusted to control the reflectance and spatial uniformity of primary reflector 110. Additionally, first portion 112 and second portion 114 of primary reflector 110 may be colored to control the chromaticity of primary reflector 110. Specifically, first portion 112 and second portion 114 of primary reflector 110 may be colored with the same color or different colors to achieve a required chromaticity of primary reflector 110.

As shown in FIG. 2, illumination assembly 10 further includes an auxiliary reflector 120. Auxiliary reflector 120 is positioned on a portion of scan head frame 1020 that is on an opposite side of target area 1004 from primary reflector 110, as shown FIG. 2. Auxiliary reflector 120 includes a support flange 122 mounted on scan head frame 1020 with suitable attachment means, such as adhesive or screws. Auxiliary reflector 120 includes a reflecting portion 124 integral with support flange 122. Alternatively, reflecting portion 124 may be a separate portion coupled with support flange 122 to form auxiliary reflector 120.

Auxiliary reflector 120, particularly reflecting portion 124, includes a curved reflecting surface 126, such as a parabolic surface or a concave surface. Curved reflecting surface 126 of reflecting portion 124 reflects light from primary reflector 110 towards target area 1004, which will be explained further in greater detail. Alternatives include those wherein reflecting portion 124 has a substantially planar reflecting surface or a curved reflecting surface, such as an elliptical surface or a convex surface, to reflect light from primary reflector 110 towards target area 1004. Further, in the example embodiment illustrated, auxiliary reflector 120, particularly reflecting portion 124, is a diffuse reflector. Alternatively, auxiliary reflector 120, particularly reflecting portion 124, may be a specular reflector or a combination of a diffuse reflector and a specular reflector. Moreover, auxiliary reflector 120 may be colored with at least one color to achieve a required chromaticity of auxiliary reflector 120. In some embodiments, reflecting surface 126 is composed substantially of plastic or glass.

Light source 100 is provided with the electrical power for emitting light. The light emitted from light source 100 is reflected towards target area 1004 by primary reflector 110 and auxiliary reflector 120. Specifically, as shown in FIG. 2, a light ray (shown with solid lines 'A') follows a first path (shown with arrowheads carried by the light ray A). The first path (arrowheads carried by the light ray A) guides light from light source 100 for directly illuminating target area 1004. As shown in FIG. 2, light ray 'A' following the first path is directly reflected by first portion 112 of primary reflector 110 towards target area 1004 through platen glass 1000. It is to be understood that for purposes of clarity only a single light ray 'A' is shown following the first path. However, a plurality of light rays, such as light ray 'A', may originate from light source 100 and be reflected by first portion 112 of primary reflector 110 towards target area 1004.

The light ray 'A' following the first path is further shown to reflect from target area 1004, such as the media to be scanned, to be captured by an image sensor (not shown) such as a charge coupled device of the scanner. Once, light ray 'A' reflects from target area 1004, the light ray 'A' may carry a particular amount of energy based on a transparency/opaqueness of target area 1004. The image sensor receives light ray 'A' and converts the light energy carried by light ray 'A' into a digital image of target area 1004. Light ray 'A' may be reflected onto the image sensor by one or more mirrors of a mirror assembly (not shown). Further, a lens (not shown) may be provided to focus light ray 'A' onto the image sensor.

FIG. 2 also shows a light ray (shown with hidden lines 'B') following a second path (shown with arrowheads carried by the light ray B). The second path (arrowheads carried by the light ray B) guides light from light source 100 for indirectly illuminating target area 1004. As shown in FIG. 2, light ray B following the second path is indirectly reflected by second portion 114 of primary reflector 110 towards target area 1004. Specifically, reflecting portion 124 of auxiliary reflector 120 reflects light ray 'B', reflected from second portion 114 of primary reflector 110. It is to be understood that for purposes of clarity only a single light ray 'B' is shown following the second path. Light ray 'B' reflected by reflecting portion 124 of auxiliary reflector 120 passes through platen glass 1000 and gets reflected from target area 1004, such as the media to be scanned. In the example embodiment illustrated in FIG. 2, light ray 'B' may be substantially parallel to target area 1004 when following the second path. Light ray 'B' may be similarly captured by the mirror assembly, which will reflect light ray 'B' towards the lens and finally light ray 'B' may be focused onto the image sensor. The image sensor will receive light ray 'B' and convert a light energy carried by light ray 'B' into a digital image of target area 1004.

Therefore, illumination assembly 10, particularly a combination of light source 100, primary reflector 110, and auxiliary reflector 120, provides high intensity illumination of target area 1004. Specifically, primary reflector 110 and auxiliary reflector 120 efficiently guide light (reflecting light ray 'A' through the first path and light ray 'B' through the second path), provided by light source 100 towards target area 1004. It is to be understood, first portion 112 and second portion 114 of primary reflector 110 may be shaped such that the first path and the second path guide (reflect) substantially concentrated light rays (such as light rays 'A' and 'B') for illuminating target area 1004.

Further, the design and arrangement of primary reflector 110 and auxiliary reflector 120 avoid wastage of light such that the amount of light emitted by light source 100 that does not contact target area 1004 is minimized. It is to be understood that a distance between light source 100 and primary reflector 110 and a distance between primary reflector 110 and auxiliary reflector 120 is adjusted in a manner such the first path and the second path efficiently guide (reflect) light rays towards target area 1004. Moreover, as shown in FIG. 2, primary reflector 110 and auxiliary reflector 120 allow target area 1004 to avoid direct contact from light provided by light source 100. Specifically, light from light source 100 is allowed to reflect from primary reflector 110 and, in some cases, auxiliary reflector 120 prior to reaching target area 1004. This enables sufficient mixing of light, which provides improved scanning quality of target area 1004. Additionally, first portion 112 and second portion 114 are separated such that a ratio of light rays reflected through the first path and the second path has a desired value to satisfy a required illumination at target area 1004 such that shadows are not formed during scanning of target area 1004. The ratio of light rays following first path 'A' to the light rays following second path 'B' may be between about 2:3 and about 3:2 and, in some embodiments, may be about 1:1.

Figure 3:
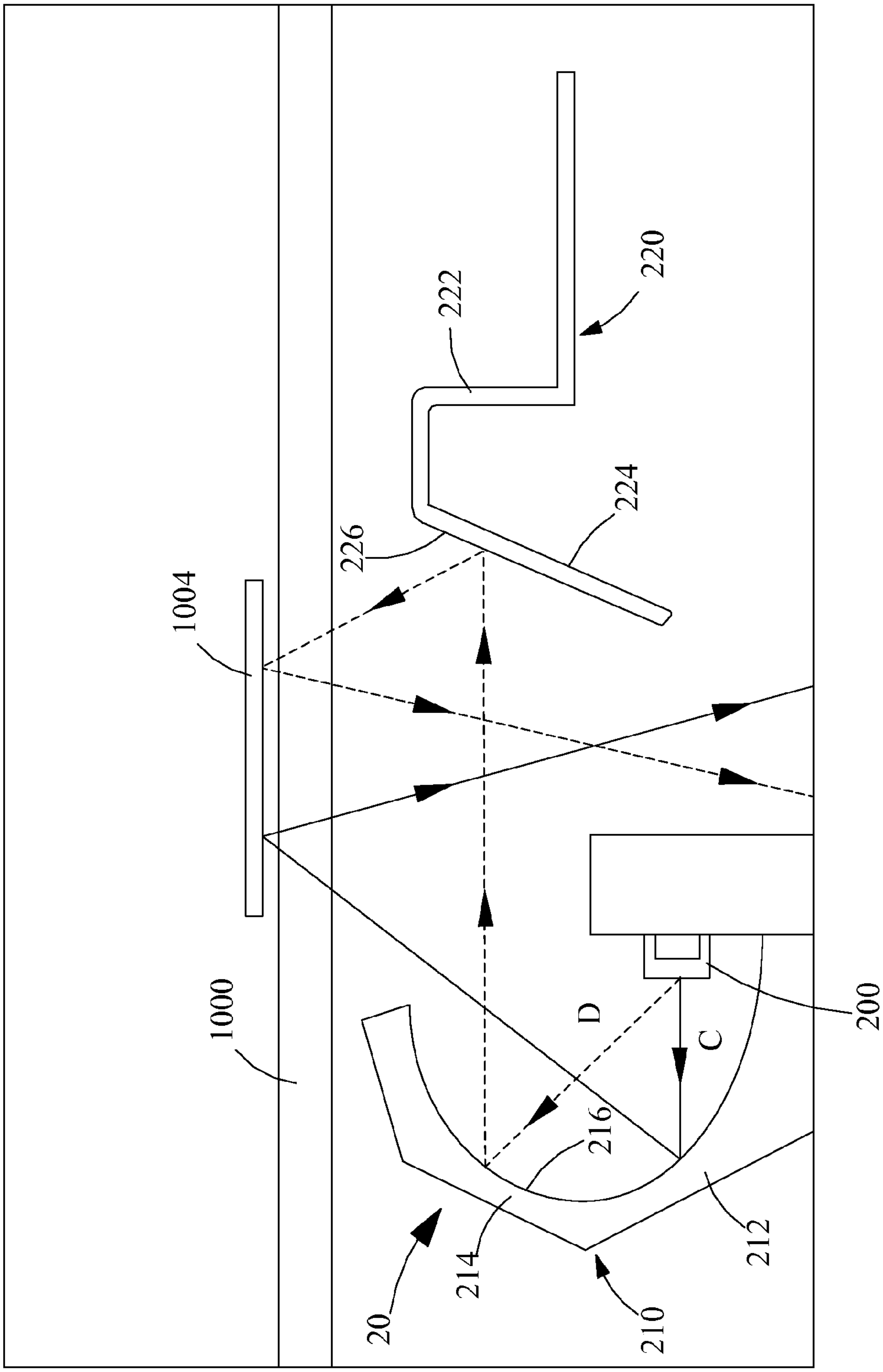
FIG. 3 is a side view depicting an illumination assembly for a scanner, according to another example embodiment.

Referring now to FIG. 3, a side view of an illumination assembly 20 is shown, in accordance with an alternative embodiment. Illumination assembly 20 is positioned under platen glass 1000 of the scanner in a similar manner as described above with regard to illumination assembly 10. Illumination assembly 20 includes a light source 200, similar to light source 100 of the illumination assembly 10, accordingly description of light source 200 is avoided for the sake of brevity.

Illumination assembly 20 further includes a primary reflector 210. Primary reflector 210 differs from primary reflector 110 of illumination assembly 10 in terms of its structural aspects. Specifically, primary reflector 210 includes a first portion 212 and a second portion 214 that form a single-faceted, curved, smooth reflecting surface 216 instead of multi-faceted reflecting surface 116 of primary reflector 110. Otherwise, primary reflector 210 is structurally and functionally similar to primary reflector 110. For example, primary reflector 210 is also configured to have a generally C-shaped structure and is a diffuse reflector. Alternatively, primary reflector 210 may be a specular reflector or a combination of the diffuse reflector and the specular reflector. Moreover, primary reflector 210 may be colored with at least one color to achieve a required chromaticity of primary reflector 210. As shown in FIG. 3, illumination assembly 20 also includes an auxiliary reflector 220, similar to auxiliary reflector 120 of illumination assembly 10. Auxiliary reflector 220, particularly reflecting portion 224, includes a planar reflecting surface 226. However, as discussed above, alternatives include those wherein reflecting portion 224 has a curved reflecting surface, such as a parabolic surface, an elliptical surface, a concave surface or a convex surface, to reflect light from primary reflector 210 towards target area 1004.

In use, illumination assembly 20 produces a high intensity illumination like illumination assembly 10. Specifically, light from light source 200 is reflected towards target area 1004, such as media sheet, by primary reflector 210 and auxiliary reflector 220. For example, as shown in FIG. 3, a light ray (shown with solid lines 'C') follows a first path (shown with arrowheads carried by light ray C). The first path (arrowheads carried by light ray C) guides (reflects) light from light source 200 to directly illuminate target area 1004. As shown in FIG. 3, light ray 'C' following the second path is shown to be directly reflected by first portion 212 of primary reflector 210 towards target area 1004.

Further, as shown in FIG. 3, a light ray (shown with hidden lines 'D') following a second path (shown by arrowheads carried by light ray D). The second path (arrowheads carried by light ray D) guides light from light source 200 to indirectly illuminate target area 1004. Specifically, light ray 'D' following the second path is indirectly reflected by second portion 214 of primary reflector 210 towards target area 1004. Specifically, reflecting portion 224 of auxiliary reflector 220 reflects light ray 'D', reflected from second portion 214 of primary reflector 210, towards target area 1004. Thereafter, light rays 'C' and 'D' may be captured by the mirror assembly and lens of the scanner and finally may be captured by the image sensor. Accordingly, the image sensor will convert light energies carried by the light rays 'C' and 'D' into a digital image of target area 1004.

An illumination assembly, such as illumination assemblies 10 and 20, provides high intensity illumination in an efficient manner. For example, the illumination assembly may be easily mounted or configured on a scan head frame of a scanner with less structural complexities. Further, the illumination assembly may provide the high intensity illumination in a cost effective manner. Specifically, use of LEDs as light source and reflectors enable in providing the high intensity illumination in the cost effective manner as compared to a conventional light source, such a xenon fluorescent lamp. Moreover, the illumination assembly improves a scanning quality of the scanner by providing a sufficiently mixed light, which is focused on an object such as a media sheet to be scanned.

The foregoing description of several embodiments of the present disclosure has been presented for purposes of illustration. It is not intended to be exhaustive or to limit the present disclosure to the precise forms disclosed, and obviously many modifications and variations are possible in light of the above teaching. It is intended that the scope of the present disclosure be defined by the claims appended hereto.

What is claimed is:

1. An illumination assembly for a scanner, comprising:

a light source;

a first reflector positioned directly in the optical path of the light source and having a first portion and a second portion forming a reflecting surface that faces the light source; and a second reflector;

wherein the light source is positioned along a length of the first reflector, the first portion of the first reflector is positioned to reflect light received from the light source toward a target area to be scanned, the second portion of the first reflector is positioned to reflect light received from the light source toward the second reflector, and the second reflector is positioned to reflect light received from the second portion of the first reflector toward the target area.

2. The illumination assembly of claim 1, wherein the reflecting surface of the first reflector has a generally C-shaped structure; and an aperture is formed along a length of the first reflector between an end portion of the C-shaped structure and the light source providing a passage above the light source for reflected light from the first reflector to illuminate the target area.

3. The illumination assembly of claim 1, wherein the first reflector substantially encloses the light source to prevent direct illumination of the target area by the light source.

4. The illumination assembly of claim 1, wherein the reflecting surface of the first reflector is a substantially single-faceted, curved surface.

5. The illumination assembly of claim 1, wherein the reflecting surface of the first reflector is a multi-faceted surface.

6. The illumination assembly of claim 5, wherein the first portion and the second portion of the first reflector each include a plurality of angularly oriented substantially straight sections.

7. The illumination assembly of claim 1, wherein the light source includes at least one white LED.

8. The illumination assembly of claim 1, wherein the first reflector is composed substantially of at least one of plastic and glass.

9. The illumination assembly of claim 1, wherein the second reflector is positioned on an opposite side of the target area from the first reflector.

10. The illumination assembly of claim 1, wherein a reflecting surface of the second reflector is curved.

11. The illumination assembly of claim 1, wherein a reflecting surface of the second reflector is substantially planar.

12. The illumination assembly of claim 1, wherein a ratio of light reflected by the first portion of the first reflector to light reflected by the second portion of the first reflector is between about 2:3 and about 3:2.

13. The illumination assembly of claim 1, wherein a ratio of light reflected by the first portion of the first reflector to light reflected by the second portion of the first reflector is about 1:1.

14. The illumination assembly of claim 1, wherein the first portion and the second portion of the primary reflector are colored for controlling the chromaticity of the primary reflector.

15. The illumination assembly of claim 1, wherein the first reflector and the second reflector are each at least one of a diffuse reflector and a specular reflector.

16. An illumination assembly for a scanner, comprising:

a light source;

a first reflector positioned directly in the optical path of the light source and having a generally C-shaped structure that substantially encloses the light source to prevent direct illumination of the target area by the light source, the first reflector having a first portion and a second portion forming a substantially single-faceted, curved reflecting surface that faces the light source, and an aperture formed along a length of the first reflector between an end portion of the C-shaped structure and the light source providing a passage above the light source for reflected light from the reflecting surface to illuminate a target area to be scanned; and a second reflector positioned on an opposite side of the target area from the first reflector;

wherein the light source is positioned along the length of the first reflector, the first portion of the first reflector is positioned to reflect light received from the light source toward the target area to be scanned, the second portion of the first reflector is positioned to reflect light received from the light source toward the second reflector, and the second reflector is positioned to reflect light received from the second portion of the first reflector toward the target area.

17. An illumination assembly for a scanner, comprising:

a light source;

a first reflector positioned directly in the optical path of the light source and having a generally C-shaped structure that substantially encloses the light source to prevent direct illumination of the target area by the light source, the first reflector having a first portion and a second portion forming a multi-faceted reflecting surface that faces the light source, and an aperture formed along a length of the first reflector between an end portion of the C-shaped structure and the light source providing a passage above the light source for reflected light from the reflecting surface to illuminate a target area to be scanned; and a second reflector positioned on an opposite side of the target area from the first reflector;

wherein the light source is positioned along the length of the first reflector, the first portion of the first reflector is positioned to reflect light received from the light source toward the target area to be scanned, the second portion of the first reflector is positioned to reflect light received from the light source toward the second reflector, and the second reflector is positioned to reflect light received from the second portion of the first reflector toward the target area.

18. The illumination assembly of claim 17, wherein the first portion and the second portion of the first reflector each include a plurality of angularly oriented substantially straight sections.

* * * * *